United States Patent Office 3,089,879
Patented May 14, 1963

3,089,879
SEPARATING 4,4'-BENZOPHENONE DICARBOXYLIC ACID FROM A MIXTURE OF 4,4'- AND 2,4'-BENZOPHENONE DICARBOXYLIC ACIDS AND CONCURRENTLY PRODUCING 2 ANTHRAQUINONE CARBOXYLIC ACID
Carl Serres, Jr., Hammond, Ind., and Ellis K. Fields, Chicago, Ill., assignors to Standard Oil Company, Chicago, Ill., a corporation of Indiana
No Drawing. Filed Dec. 21, 1959, Ser. No. 860,742
3 Claims. (Cl. 260—376)

This invention relates to a process for the concurrent preparation of 4,4'-benzophenone dicarboxylic acid and 2-anthraquinone carboxylic acid.

The 4,4'-benzophenone dicarboxylic acid is a known compound and is known to be useful in the preparation of alkyd resins, plasticizers, and as a useful intermediate in the preparation of other organic chemical compounds. The 2-anthraquinone carboxylic acid is also known and is useful as a dye intermediate.

In U.S. Patent 2,806,059 there is described a process for preparing mixtures containing 4,4'-benzophenone dicarboxylic acid and 2,4'-benzophenone dicarboxylic acid by the oxidation in in a liquid phase system of mixtures of isomers of ditolyl ketones (di-p-tolyl ketone and p-tolyl-o-tolyl ketone) and isomeric ditolyl methanes (di-p-tolyl methane and p-tolyl-o-tolyl methane) with molecular oxygen-containing gas in the presence of an oxidation catalyst comprising the combination of methyl ethyl ketone and a heavy metal such as cobalt in an amount of at least 5 percent by weight as the feed stock. Acetic acid was employed as the preferred reaction solvent. Insofar as the preparations of 2,4'-benzophenone dicarboxylic acid and 4,4'-benzophenone dicarboxylic acid were concerned, the processes illustrated were exceedingly slow, required 28 hours at 90° C. and 48 hours at 80° C. Although these were considered by the patentees as their best mode of conducting the described oxidation, such a process would not be commercially acceptable.

It is known that 2,4'-benzophenone dicarboxylic acid can be heated with a cyclizing agent such as sulfuric acid and converted to 2-anthraquinone carboxylic acid as follows:

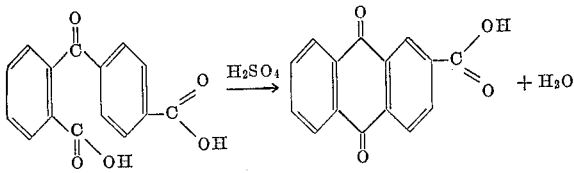

U.S. Patent 2,806,059 also discloses as a method for separating the two isomeric benzophenone dicarboxylic acids the extraction of 2,4'-benzophenone dicarboxylic acid from the mixture with boiling ethyl alcohol. Hence, to produce 2-anthraquinone carboxylic acid from the mixture of 4,4'- and 2,4'-benzophenone dicarboxylic acids produced by the oxidation of the corresponding isomeric ditolyl methanes would first require some separtion of the mixture of the two benzophenone dicarboxylic acids such as with boiling ethyl alcohol.

We have discovered a method for treating the mixtures of 2,4'- and 4,4'-benzophenone dicarboxylic acids whereby the 2,4'-isomer is converted into 2-anthraquinone carboxylic acid and this acid is separated from the 4,4'-benzophenone dicarboxylic acid by converting the mixture to the alkali metal salts of the acids. The alkali metal salts of 2-anthraquinone carboxylic acid are substantially insoluble in aqueous solutions of alkali metal hydroxides whereas the alkali metal salts of 4,4'-benzophenonedicarboxylic acid are substantially completely souble in said aqueous solutions. Thus, the mixture of 2-anthraquinone carboxylic acid and 4,4'-benzophenone dicarboxylic acid can be readily separated, e.g. by treating the mixture of these acids with an aqueous solution of alkali metal hydroxide to form and dissolve the soluble dialkali 4,4'-benzophenone dicarboxylate and to form the insoluble alkali 2-anthraquinone carboxylate as undissolved solid. The free acids are easily reconstituted with a mineral acid.

In our copending application Serial No. 730,830 we have disclosed our discovery that alkylated diphenylmethanes wherein the alkyl group contain 1 to 4 carbon atoms can be oxidized in a liquid phase oxidation process with molecular oxygen in the presence of a catalyst system comprising a heavy metal oxidation catalyst and a source of bromine to the corresponding benzophenone carboxylic acids. By this process benzophenone carboxylic acids can be prepared in yields of above 90 mole percent in less than one hour with the use of far less heavy metal catalyst; i.e., 0.3 to 2% based on the alkylated disphenylmethane. By utlizing a mixure of 2,4'- and 4,4'-di-(alkyl ($C_1$ to $C_3$) phenyl) methanes a mixture of benzophenone dicarboxylic acids is produced which is readily recovered from the reaction mixture resulting from said oxidation by filtration. The mixture of 2,4'- and 4,4'-benzophenone dicarboxylic acids is directly treated with a cyclizing agent, converting the 2,4'-benzophenone dicarboxylic acid to 2-anthraquinone carboxylic acid and leaving the 4,4'- benzophenone dicarboxylic acid unchanged. These two acid products are then separated by utilizing the great difference in solubility of their alkali metal salts in water solution of alkali metal hydroxide.

The mixture of 2,4'- and 4,4'-dialkyl diphenylmethanes employed as a feedstock for the process of this invention naturally result from the toluene sulfonic acid catalyzed condensation of a monalkylbenzene such as toluene, ethylbenzene, monopropylbenzenes, and monobutylbenzenes with formaldehyde. The process of this invention, therefore, provides a convenient method for converting such mixtures to highly useful products without first having to separate the mixtures into substantially pure isomers and separately oxidizing each isomer and then cyclizing the 2,4'-dicarboxylic acid obtained from its isomer.

For a complete disclosure of our oxidation process we refer to our copending application, Serial No. 730,830, filed April 25, 1958. In general, the more rapid oxidation is accomplished by employing a source of bromine in addition to the heavy metal oxidation catalysts such as the polyvalent metals having atomic weights between about 50 and 200, which have heretofore been suggested. Excellent results are obtained by utilization of a source of bromine with a metal having an atomic number 23–28, including vanadium, chromium, manganese, iron, cobalt, and nickel. Particularly excellent results are obtained with a metal of the group consisting of magnese, cobalt and mixtures thereof.

It has been found that the catalytic amount of the metal may be either as a single metal or as a combination of such metals. The metal may be added in elmental, combined or ionic form and the bromine may similarly be added in elmental, combined or ionic form. As a source of bromine, ammonium bromide or other bromine compounds soluble in the reaction medium may be employed. Satisfactory results have been obtained, for example, with potassium bromide, tetrabromoethane and benzyl bromide.

The metal may be supplied in the form of the free metal, as the oxide or hydroxide, or in the form of metal salts. For example, the metal manganese may be supplied as the manganese salt of a lower aliphatic carboxylic acid, such as manganese acetate, as the salt of a fatty acid such as manganese oleate or linoleate, as the metal salt of an aromatic or alicyclic acid, such as manganese naphthenate, or in the form of an organic complex, of which mention may be made of the acetylacetonate, the 8-hydroxy-quinolinate and the ethylene diamine tetraacetate, etc., as well as manganese salts such as the borates, halides, nitrates and the like which are also efficacious.

The reaction temperature should be sufficiently high so that the desired oxidation reaction occurs, and yet not so high as to cause undesirable charring or formation of tars. Thus, temperatures in the range of about 120° to about 275° C., desirably 150 to 250° C. and preferably 170° to 225° C. may be employed. A reaction time sufficient to obtain a desirable conversion of the di-(alkylated phenyl) methanes to the desired carboxylic acid will be in the range of about 0.5 to about 4 hours.

The oxygen used may be in the form of substantially 100% oxygen gas or in the form of gaseous mixtures containing lower concentrations of oxygen, such as, for example, air. The ratio of total oxygen fed into the reaction mixture relative to the aromatic compound oxidized is in the range of about 2 to 500 moles of oxygen per mole of susbtituted aromatic material, desirably in the range of 5 to 300, preferably in the range of 5 to 75.

The process of the present invention is conduced under essentially liquid phase conditions, desirably in the presence of an oxidation resistant reaction medium in which the organic reactant is soluble or suspended. The relaton of temperature and pressure is so regulated as to provide a liquid phase in the reaction zone. Generally the pressure may be in the range of atomspheric to about 1500 p.s.i.g., the pressure being sufficent at the operating temperature to maintain all or a part of the organic reactant in the liquid phase.

As inert reaction media there may be employed materials substantially inert to oxidation which facilitate carrying out the desired reaction and recovering the desired product or products. Desirably this added medium is a monocarboxylic acid relatively stable or inert to oxidation in the reaction system, preferably containing about 2 to 8 carbon atoms in the molecule, for example, saturated aliphatic monocarboxylic acids, aromatic acids such as benzoic acid, alicyclic acids such as cyclohexane carboxylic acid and the like. Saturated aliphatic monocarboxylic acids containing 2 to 4 carbon atoms are particularly prefered. Mixtures of acids may be used, for example, mixtures of said lower carboxylic acids, or mixtures of such acids with benzoic acid. Where all of the advantages of an acid medium are not required, other inert media may be used, of which mention may be made of benzene, carbon tetrachloride, chlorinated hydrocarbons such as chlorinated benzenes or chlorinated naphthalenes, and the like.

Where the lower aliphatic monocarboxylic acid medium is used, it is generally not necessary to use large amounts thereof. Such acids in the range of 0.1 to 10 parts by weights, desirably 0.5 to 4 and preferably 1 to 2.5 per part of aromatic material have been found adequate.

The catalyst, illustratively, may be a heavy metal bromide, for example, manganese bromide, and may be added as such or by means of materials which provide a catalytic amount of heavy metal and of bromine in the reaction system. The heavy metal oxidation catalyst may be added in the form of the metal, oxide, acetate or analogous carboxylate salts or as a heavy metal halide; and the bromine may, as above indicated, be added in the form of elemental bromine, ammonium bomide, hydrogen bromide or other bromine compound soluble or partially soluble in the system; e.g., potassium bromate. If desired, the bromine may be in the form of a soluble organic bromide, viz. tetrabromoethane, benzyl bromide and the like. The amount of catalysts, for example, of manganese and bromine, calculated as $MnBr_2$ may be in the range of about 0.1 to less than 5 percent by weight of the aromatic reactant charged, desirably 0.3 to 2 and preferably 0.5 to 1.7 percent. Mixtures of materials may be used, and the proportions of heavy metal oxidation catalyst and bromine may be varied from their stoichiometric proportions encountered in heavy metal bromides such as $MnBr_2$, for example, in the range of about 1 to 10 atoms of bromine per atom of heavy metal.

The mixture of benzophenone dicarboxylic acids is readily separated from the reaction mixture resulting from the oxidation step by cooling the reaction mixture and separating the benzophenone dicarboxylic acids which are solids. The mixture of benzophenone dicarboxylic acids is then subjected to cyclizing with any of the known cyclizing agents. For this step sulfuric acid is preferred. The cyclizing is accomplished at temperatures of at least 150° C., and, when sulfuric acid is employed, it is preferred that the cyclizing step be carried out a temperature of 150 to 200° C. The cyclizing step results in a mixture of 2-anthraquinone carboxylic acid and 4,4'-benzophenone dicarboxylic acid. This mixture is treated with sufficient alkali metal, preferably as the hydroxide, to neutralize the sulfuric acid, if not previously removed, and to form the alkali metal salts of the two organic acids. It is preferred that the cyclizing agent be removed before the alkali metal salts are formed. When sulfuric acid is the cyclizing agent, it can be readily removed by quenching or washing with water the mixture resulting from the cyclizing reaction. It is desirable to have at least a 10% excess of alkali metal hydroxide present, preferably 100% excess, of that required to neutralize the acetic components of the mixture of acids, when the mixed alkali metal salts are taken up in aqueous alkali metal hydroxide solution. As hereinbefore stated, the alkali metal salts of the benzophenone dicarboxylic acid are moderately water soluble, whereas the alkali metal salt of 2-anthraquinone carboxylic acid is substantially insoluble when an excess of alkali metal hydroxide is present. Separation is accomplished, for example, by filtration, decantation, and any other suitable method for separating a solution from undissolved solids. The undissolved alkali metal salt of 2-anthraquinone carboxylic acid can be treated with an aqueous solution of mineral acid or an aqueous solution saturated with carbon dioxide under pressure or an aqueous solution of sulfur dioxide to spring the free 2-anthraquinone carboxylic acid. The benzophenone dicarboxylic acid salt in solution can be treated with mineral acid or saturated with carbon dioxide, preferably under pressure, or treated with sulfur dioxide to spring the 4,4'-benzophenone dicarboxylic acid.

In order to facilitate a clear understanding of the invention, the following preferred specific embodiments are described in detail.

*Example 1*

A suitable reactor having a corrosion-resistant inner surface (glass, ceramic or corrosion-resistant metal or alloy) equipped with agitating means such as a mechanical agitating device or gas flow agitating means, means for heating or cooling the contents thereof such as a coil or jacket, a reflux condenser, a gas inlet tube and a vent line from the reflux condenser containing a pressure regulating valve, is employed as the oxidation reaction vessel.

Ditolylmethane is prepared by the toluene sulfonic acid catalyzed condensation of paraformaldehyde and toluene. A mixture of 50 grams (0.255 mole) of this ditolylmethane, 143 ml. (2.5 moles) of acetic acid, and a solution of 0.2 gram of cobalt acetate, 0.4 gram of manganese acetate and 0.2 gram of ammonium bromide in 6 ml. water is heated in a Hastelloy tube equipped with a condenser, at 400° F., while air at 400 p.s.i.g. is passed through the mixture at the rate of 0.13 cubic feet per minute. After reaction is completed, the acetic acid solution is removed. It contains much solid which is removed by filtration, water washed and dried to yield 44 grams of light-colored benzophenone dicarboxylic acids.

A 5.0 gram sample of this product is heated with 50 ml. of concentrated sulfuric acid at 150–160° C. for 75 minutes and the hot solution is poured onto crushed ice. The precipitated acids are filtered. The wet precipitate is treated with hot, moderately concentrated sodium hydroxide solution, then cooled and filtered, to remove the insoluble sodium salt of 2-anthraquinone carboxylic acid. This wet sodium salt is heated for a few minutes in dilute hydrochloric acid solution and the free 2-anthraquinone carboxylic acid filtered. This acid, after drying, melts at 288–291° C. (literature 290–292° C.) and weighs 1.7 grams (95% of theory for cyclization and recovery). The filtrate containing the sodium salt of 4,4'-benzophenone dicarboxylic acid is acidified with concentrated hydrochloric acid to spring the free acid. The acid is filtered, water washed, and dried. It weighs 3.0 grams. Its neutral equivalent is 132 (calculated 135).

The above example illustrates how conveniently our oxidation process described in our copending application heretofore cited and the process of this invention can be conveniently integrated into a commercially acceptable process.

*Example 2*

Four grams of a 50–50 mixture of 2,4'-benzophenone dicarboxylic acid and 4,4'-benzophenone dicarboxylic acid, obtained, for example, by the above oxidation of a mixture containing equal amounts of 2,4'- and 4,4'-di-(ethylphenyl) methane, together with 40 ml. of concentrated sulfuric acid, are heated at 150–160° C. Complete solution of the acids occurs. The solution is maintained at this temperature for 75 minutes and then worked up as described in Example 1. This furnished 1.78 grams (95.5% of theory) of 2-anthraquinone carboxylic acid and 1.95 grams (97.5% recovery) of 4,4'-benzophenone discarboxylic acid.

The treatment of the mixtures of 2,4'- and 4,4'-benzophenone dicarboxylic acids to accomplish formation of 2-anthraquinone carboxylic acid and the separation thereof from 4,4'-benzophenone dicarboxylic acid is not limited to the source of the mixture of isomeric benzophenone dicarboxylic acids. The mixture employed in Example 2 could also have been derived from the oxidation process illustrated in U.S. Patent 2,806,059 or from the chromic acid, permanganate, or nitric acid oxidation processes heretofore disclosed in German Patent 80,407, U.S. Patent 2,202,063 or in the process reported in Ber. 7, 1183.

What is claimed is:

1. A process for separating 4,4'-benzophenone dicarboxylic acid from a mixture of 4,4'- and 2,4'-benzophenone dicarboxylic acids and concurrently producing 2-anthraquinone carboxylic acid which comprises heating such mixture of benzophenone dicarboxylic acids in the presence of sulfuric acid to convert 2,4'-benzophenone dicarboxylic acid to 2-anthraquinone carboxylic acid, treating the resulting mixture with water to precipitate a mixture of 4,4'-benzophenone dicarboxylic acid and 2-anthraquinone carboxylic acid, separating said mixture from the resulting aqueous solution of sulfuric acid, reacting the sulfuric acid free mixture of 4,4'-benzophenone dicarboxylic acid and 2-anthraquinone carboxylic acid with an aqueous solution of sodium hydroxide containing sodium hydroxide in an amount which is a 10 percent excess over that required to react with the carboxy groups and an amount of water sufficient to dissolve the 4,4'-benzophenone dicarboxylate leaving sodium 2-anthraquinone carboxylate as a solid, separating said solution from said solid, and separately reconstituting 2-anthraquinone carboxylic acid and 4,4'-benzophenone dicarboxylic acid.

2. A process for concurrently producing 4,4'-benzophenone dicarboxylic acid and 2-anthraquinone carboxylic acid which comprises oxidizing a mixture containing 4,4'-di-(monoalkylphenyl) methane and 2,4'-di-(monoalkylphenyl) methane wherein said alkyl groups contain 1 to 3 carbon atoms to a reaction mixture containing 4,4'- and 2,4'-benzophenone dicarboxylic acids, separating said mixture of benzophenone dicarboxylic acids from the oxidation reaction mixture by filtration, heating said mixture of benzophenone dicarboxylic acids in the presence of sulfuric acid to convert 2,4'-benzophenone dicarboxylic acid to 2-anthraquinone carboxylic acid, treating the resulting mixture with water to precipitate a mixture of 4,4'-benzophenone dicarboxylic acid and 2-anthraquinone carboxylic acid, separating said precipitate from the resulting aqueous solution of sulfuric acid, reacting the sulfuric acid free mixture of 4,4'-benzophenone dicarboxylic acid and 2-anthraquinone carboxylic acid with an aqueous solution of sodium hydroxide containing sodium hydroxide in an amount which is a 10 percent excess over that required to react with the carboxy groups and an amount of water sufficient to dissolve disodium 4,4'-benzophenone dicarboxylate leaving sodium 2-anthraquinone carboxylate as a solid, separating said solution from said solid, and separately reconstituting 2-anthraquinone carboxylic acid and 4,4'-benzophenone dicarboxylic acid.

3. A method of separating 4,4'-benzophenone dicarboxylic acid from a mixture of 2,4'- and 4,4'-benzophenone dicarboxylic acids and concurrently producing 2-anthraquinone carboxylic acid which comprises heating said mixture of benzophenone dicarboxylic acids with sulfuric acid to convert 2,4'-benzophenone dicarboxylic acid to 2-anthraquinone dicarboxylic acid, reacting the resulting mixture of acids with an aqueous solution of sodium hydroxide containing sodium hydroxide in an amount which is in the range of 10–100% in excess of that required to neutralize the acetic components of said mixture of acids and containing an amount of water sufficient to dissolve disodium 4,4'-benzophenone dicarboxylate in the aqueous sodium hydroxide solution thereby leaving insoluble sodium 2-anthraquinone carboxylate as a solid, separating undissolved solid sodium 2-anthraquinone carboxylate from said solution of disodium 4,4'-benzophenone dicarboxylate, and separately reconstituting 2-anthraquinone carboxylic acid and 4,4'-benzophenone dicarboxylic acid from their respective sodium salts.

References Cited in the file of this patent

UNITED STATES PATENTS 2,806,059    Bruson _____ Sept. 10, 1957

FOREIGN PATENTS 80,407    Germany _____ Oct. 20, 1894